United States Patent [19]

Nakagawa

[11] Patent Number: 4,624,536

[45] Date of Patent: Nov. 25, 1986

[54] FOUR COMPONENT ZOOM LENS

[75] Inventor: Jihei Nakagawa, Kawasaki, Japan

[73] Assignee: Sigma Corporation, Tokyo, Japan

[21] Appl. No.: 463,249

[22] Filed: Feb. 2, 1983

[30] Foreign Application Priority Data

Feb. 2, 1982 [JP] Japan ................................ 57-14348

[51] Int. Cl.⁴ ...................... G02B 15/00; G02B 15/15
[52] U.S. Cl. ..................................... 350/423; 350/429
[58] Field of Search ...................... 350/423, 427, 429

[56] References Cited

U.S. PATENT DOCUMENTS 2,741,155 4/1956 Hopkins .............................. 350/427
3,051,052 8/1962 Bergstein ............................ 350/423
3,549,242 12/1970 Higuchi et al. ..................... 350/423
4,232,942 11/1980 Ikamori ............................... 350/423

Primary Examiner—John K. Corbin
Assistant Examiner—Scott J. Sugarman
Attorney, Agent, or Firm—Brisebois & Kruger

[57] ABSTRACT

A zoom lens in which two pairs of optical elements of the lens are each movable simultaneously relative to each other to attain desired magnification while maintaining the image surface of the lens system substantially fixed.

A common body supporting both sets of lens elements can be moved if required to maintain the focal plane of the lens system fixed. The need for moving the body may arise where the movement of the lens elements causes a shift or displacement of the focal plane of the zoom lens.

6 Claims, 5 Drawing Figures

FOUR COMPONENT ZOOM LENS

BACKGROUND OF THE INVENTION

Conventional zoom lens systems having a variable power arrangement composed of four lens components are known. In these conventional systems, the first and third components are normally fixed, whereas the second and fourth components are connected to each other so that the distance between them remains constant while they are moved linearly to vary the power of the lens system.

While this conventional construction has the advantage of mechanical and structural simplicity, the selection of operable lenses is quite restricted which in turn restricts the achievable power of the system, and aberration compensation is quite difficult. In essence, having only one set of lenses movable with respect to a fixed second set of lenses restricts the selection of operable lenses, thereby either limiting the power or magnification of the lens system, or presenting significant difficulties in compensating for aberration.

SUMMARY OF THE INVENTION

In accordance with this invention, at least two lenses are coupled together to move linearly while the distance between them is maintained constant, and two additional lenses are coupled together to maintain the distance between them constant, and these two additional lenses are moved simultaneously as the first two lenses are moved. By moving the two sets of lenses independently, optically variable power or magnification of a desired extent is attained, while simultaneously compensating for movement of the focal plane or image surface of the lens system which would normally occur where only one set or pair of the lenses is movable.

In accordance with the invention, compensation for movement of the focal plane or image surface of the lens system can be attained by simultaneously moving both the first and second sets of lenses relative to each other. It is, however, possible in accordance with the invention, to also move a body supporting both sets of lenses simultaneously, to maintain the focal plane or image surface of the lens system at a fixed location. In some instances, it is possible to dispense with movement of one set of lenses, and provide compensation by moving the body supporting both sets of lenses. In the preferred form of the invention, all movement is straight line, or linearly, for simplicity of mechanical construction. However, it is to be appreciated and understood that some slight deviations from true linear movement may be required, depending on lens selection, in order to attain virtually complete compensation for aberration, while maintaining the focal plane constant.

In all embodiments, the required and determined movement of the two sets of lenses with respect to each other, or the body carrying the lenses, occurs simultaneously, preferably as a result of manual manipulation of a common actuator having multiple cams to provide the required movement within the operable range of the respective lenses.

In the version of the invention where the two sets of lenses are simultaneously movable relative to each other, the movement of these lenses is so selected with respect to the lens characteristics, that the focal plane or image surface is maintained at a fixed or constant location relative to an optical device such as a camera or the eyepieces of, for example, a telescope. Where the body carrying the sets of lenses is also movable, a much greater range of selection of lenses is permissable. In essence, additional compensation for aberration and shift of the focal plane of the lens system can be attained by also simultaneously moving the body supporting the lenses.

To assure that the lens system is operable over the entire range of movement, it is preferred that each of the movable lenses move in accordance with the laws of straight line movement. However, as indicated above, slight deviations from true straight line or linear movement may be required to fully compensate for aberration, or for shifting of the image plane.

A significant advantage of moving the two sets of lenses linearly, but independently, is that the number of different lenses which can be selected to operably function in the system is vastly increased over a system in which only one set of lenses is movable. Correspondingly, not only can greater power or magnification be attained from the lens system, but aberration can be avoided and compensated for both as a result of lens selection and relative independent movement of the sets of lenses. Further compensation or correction can be attained by simultaneously moving the body holding the lenses as the lenses themselves are moved.

DETAILED DESCRIPTION

Figure 1:
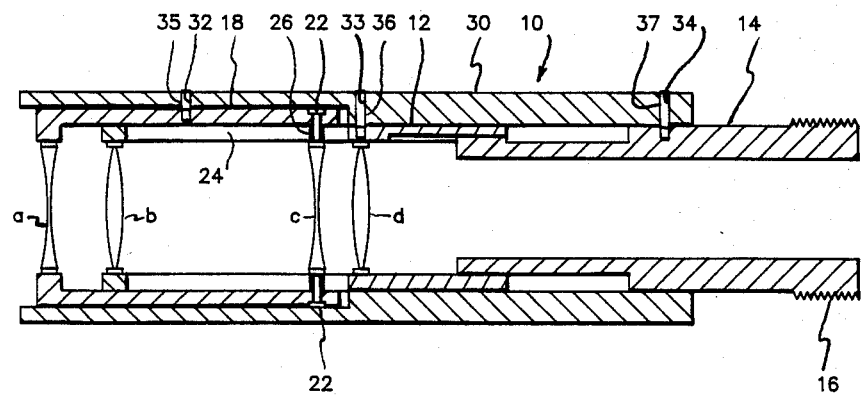
FIG. 1 is a generally schematic view in axial section of a four component zoom lens according to the invention.

FIG. 1 shows a zoom lens system 10 in accordance with this invention. As shown, there are four lenses designated a, b, c, and d. (The lenses a, b, c, and d are later designated herein as I, II, III, and IV, respectively.) In FIG. 1, lenses a and c are shown as negative lenses and lenses b and d are shown as positive lenses. In accordance with the invention, however, a and c can be positive and b and d can be negative, as will be evident later.

In the description to follow, lenses a, b, c, and d are designated respectively as the first, second, third, and fourth lenses.

As shown in FIG. 1, lenses b and d are fixed to a tube 12 which is keyed to a connector 14 so that tube 12 can move axially but cannot rotate. The connector 14 is provided with some means for connecting the connector to a camera, such as threads 16.

Extending around tube 12 is a sleeve 18 which is axially slidable on the tube 12. Fixed to sleeve 18 are the lenses a and c. Lens c is fixed to sleeve 18 by screws 22 which extend through axially extending slots 24 formed in tube 12 as shown at FIG. 1. On the portion of at least one of the screws 22 which extends through slot 24 is a sleeve 26 of a size to be a close sliding fit in slot 24 so that sleeve 18 can move axially relative to tube 12 but cannot rotate.

Extending around tube 12 and sleeve 18 is an elongated adjusting barrel 30. Adjusting barrel 30 is rotatable relative to sleeve 18, tube 12, and connector 14, and is a close sliding fit with respect to these components of the lens system.

Formed in sleeve 30 are slots 32, 33, and 34. A follower pin 35 fixed to sleeve 18 extends into slot 32. A follower pin 36 fixed to tube 12 extends into slot 33, and a follower pin 37 fixed to connector 14 extends into slot 34. Each of these slots can extend, for example, 150° circumferentially of adjustng barrel 30.

Figure 2:
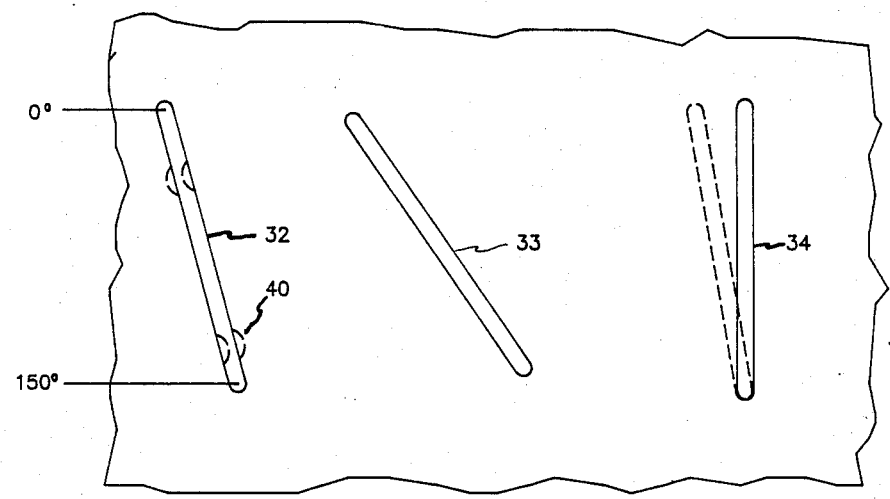
FIG. 2 is an unrolled view of the adjusting barrel of FIG. 1 showing the cam slot arrangement for providing the desired movement of the components of the zoom lens system.

Slot 34 will normally be in a radial plane perpendicular to the axis of adjusting barrel 30. This arrangement is shown at FIG. 2 in solid lines. However, depending on the lenses selected, it may be necessary to shift barrel 30 relative to connecter 14 which in turn shifts sleeve 18 and tube 12 axially simultaneously, to obtain correction for a shift in the focal plane of the lens system which cannot be compensated for simply by moving the lenses. Such compensation can be attained by forming slot 34 as shown, for example, in dotted lines at FIG. 2 where such additional correction is required.

It is preferred that cams 32 and 33 each be helical so that the movement of the lenses is linear and follows the laws of straight line movement, such movement being directly proportional to the extent of rotation of adjusting barrel 30.

Figure 5:
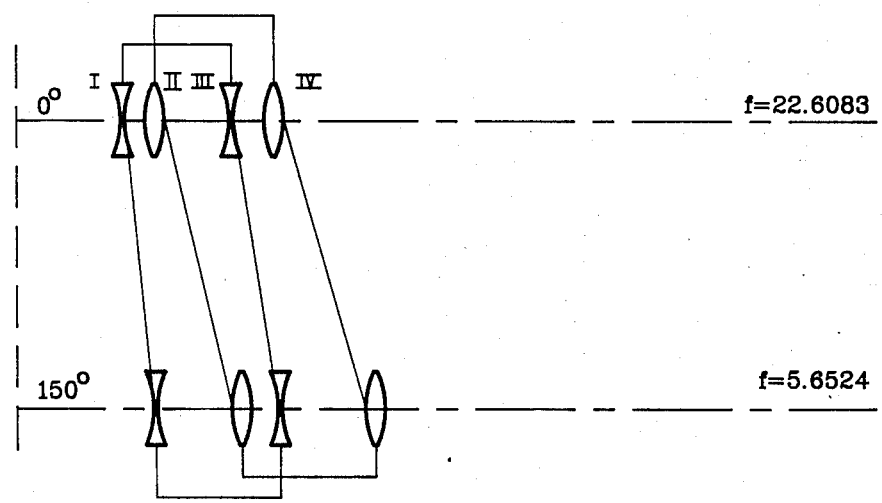
FIG. 5 shows movement of a particular lens system composed of negative, positive, negative, and positive lenses, in that order.

As shown at FIG. 2, the start of zoom is designated 0° and the end of zoom is designated 150°. Since the cam slots are helical, the motion of the lenses will be linear. However, for purposes of aberration correction or maintaining the focal plane of the lens system precisely fixed relative to the camera or other device with which the lens system is used, one or more of the cams can have non-helical (non-linear) characteristics to provide the desired lens movement, as shown for the cam 32 in dotted lines at 40 of FIG. 2.

Where slot 34 is in a radial plane, follower pin 37 cooperates with the slot to maintain the position of barrel 30 axially fixed while permitting adjustment rotation. With the barrel 30 so fixed against axial movement, rotation of the barrel will simultaneously move sleeve 18 and the lenses a and c fixed to the sleeve, and tube 12 and the lenses b and d fixed to the tube 12. Typical displacements of the lenses are shown at FIG. 5 where the lens system has the mechanical components of FIGS. 1 and 2.

Where shifting of barrel 30 is required to attain additional correction, cam slots 34 can be formed as shown in dotted lines at FIG. 2 so that the adjusting barrel moves axially simultaneously with the axial movement of sleeve 18 and tube 12. This provides additional compensation and further decreases the selection range of operable lenses.

It is to be appreciated that FIG. 1 shows a construction which is merely exemplary and that the actual movements of the lenses can differ considerably from those provided by barrel 30 in the construction shown at FIGS. 1 and 2.

It is to be appreciated that the cam slot and follower pin arrangement shown at FIG. 1 is only exemplary, and that various different types of cam and follower arrangements can be used as well as different support arrangements for the respective lenses.

Figure 3:
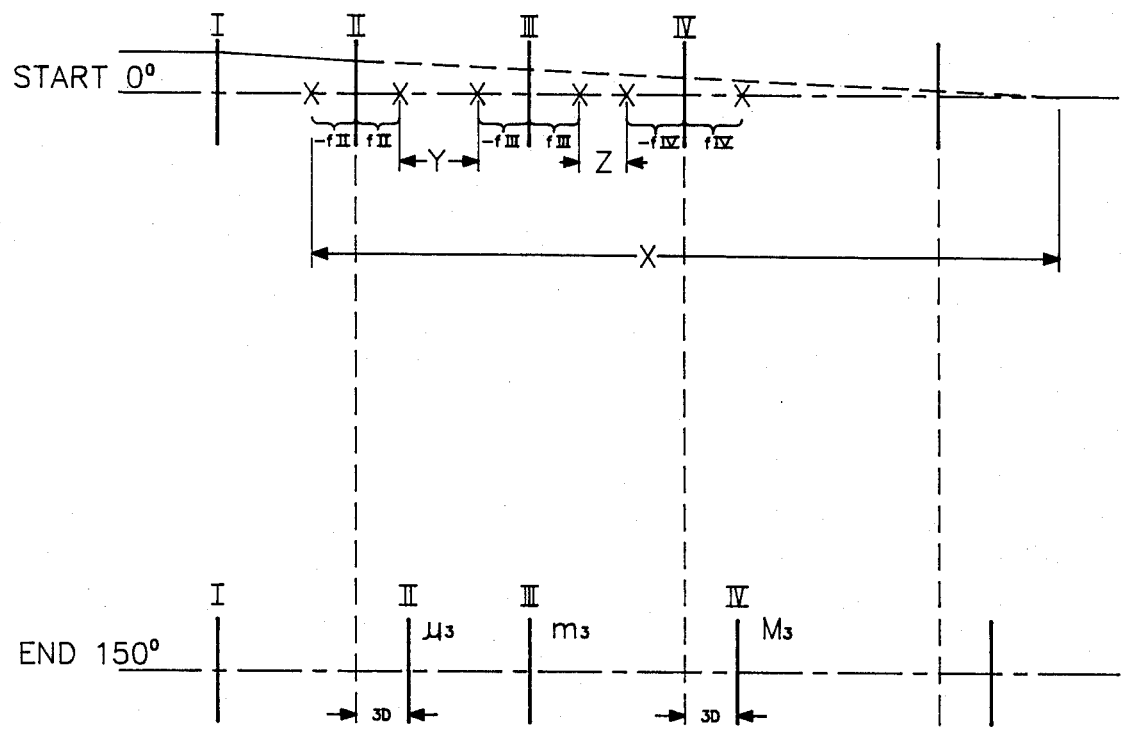
FIG. 3 is a diagrammatic view showing certain relationships between lenses of a four component system.

FIG. 3 shows the theory, when each focal length of four lens components disposed in order from the top such as I, II, III, IV is designated as $f_I$, $f_{II}$, $f_{III}$, $f_{IV}$, and also the magnification of each lens component is designated as $\mu_0$, $m_0$, $M_0$ when starting zooming.

Here, consider the conventional four component optical compensating system zoom lens, if the magnification is designated as $\mu_1$, $m_1$, $M_1$; $\mu_2$, $m_2$, $M_2$; $\mu_3$, $m_3$, $M_3$ when the second and fourth components move integrally toward the image surface (right side) the amount of D, 2D, 3D, the formula can be as follows: R which represents a zoom ratio will be:

$$R = \mu_0/\mu_2 \cdot m_0/m_3 \cdot M_0/M_3 \qquad (1)$$

When the interval between the focal point of the first lens component I and the front side of the second lens component II is designated as X, the magnifications will be:

$$\mu_0 = \frac{f_1^2}{X} \qquad (2)$$

$$\mu_1 = \frac{f_1^2}{(X-D)}$$

$$\mu_2 = \frac{f_1^2}{(X-2D)}$$

$$\mu_3 = \frac{f_1^2}{(X-3D)}$$

Then, as a condition that there is no movement of image surface under each condition, the formulas can be as follows:

$$\begin{aligned}-M_0 f_{IV} + M_1 f_{IV} &= D \\ -M_0 f_{IV} + M_1 f_{IV} &= 2D \\ -M_0 f_{IV} + M_1 f_{IV} &= 3D\end{aligned} \qquad (3)$$

Also, since the image point of the second lens component II is the object point of the third component III, when the distance between the second and third lens component II, III is designated as Y, the formulas can be as follows:

$$\frac{f_{III}}{m_0} + Y = -\mu_0 f_{II} \qquad (4)$$

$$\frac{f_{III}}{m_1} + (Y - D) = -\mu_1 f_{II}$$

$$\frac{f_{III}}{m_2} + (Y - 2D) = -\mu_2 f_{II}$$

$$\frac{f_{III}}{m_3} + (Y - 3D) = -\mu_3 f_{II}$$

As for between the third and fourth lens components III and IV, similarly the formulas can be as follows:

$$\frac{f_{IV}}{M_0} + Z = -m_0 f_{III} \qquad (5)$$

$$\frac{f_{IV}}{M_1} + (Z + D) = -m_1 f_{III}$$

$$\frac{p_{IV}}{M_2} + (Z + 2D) = -m_2 f_{III}$$

-continued $$\frac{f_{IV}}{M_3} + (Z + 3D) = -m_{3III}$$

Z represents the distance of focal points between the third and fourth lens components III and IV.

When, therefore, solving the said formulas, power distribution of four component optical compensating system zoom lens will be given.

Although the present invention means that the first and third lens components have integrally been moved, this also can be regarded to be the same as image surface movement of D, 2αD, 3αD when the first and third lens components I, III are unmovable. In this case, formula (3) will be as follows:

$$\left.\begin{array}{l}-M_0'f_{IV}' + M_1'f_{IV}' = \alpha D \\ -M_0'f_{IV}' + M_2'f_{IV}' = 2\alpha D \\ -M_0'f_{IV}' + M_3'f_{IV}' = 3\alpha D\end{array}\right\} \quad (6)$$

Prime indicates the magnification and focal length of the fourth lens component. By changing only the magnification and focal length of use of the result obtained compared to the conventional optical compensating system zoom lens. That is, the difference between the first and second in formula (5) will be:

$$m_0 f_{III} - M_1 f_{III} = \frac{f_{IV}}{M_1} - \frac{f_{IV}}{M_0} + D = \frac{-Df_{IV}^2}{M_0 f_{IV}(M_0 f_{IV} + D)} + D$$

The formula which corresponds to the above will be $$m_0 f_{III} - m_1 f_{IV} = \frac{f_{IV}}{M_1'} - \frac{f_{IV}}{M_0'} + D = \frac{-\alpha Df_{IV}^2}{M_0'f_{IV}(M_0'f_{IV} + D)} + D$$

when the value of $m_0 f_{III} - M_1 f_{IV}$ has not changed, the following relation will be right:

$$f_{IV} = \sqrt{\alpha}\, f_{IV},\ M_0 = \sqrt{\alpha}\, M'_0$$

Figure 4:
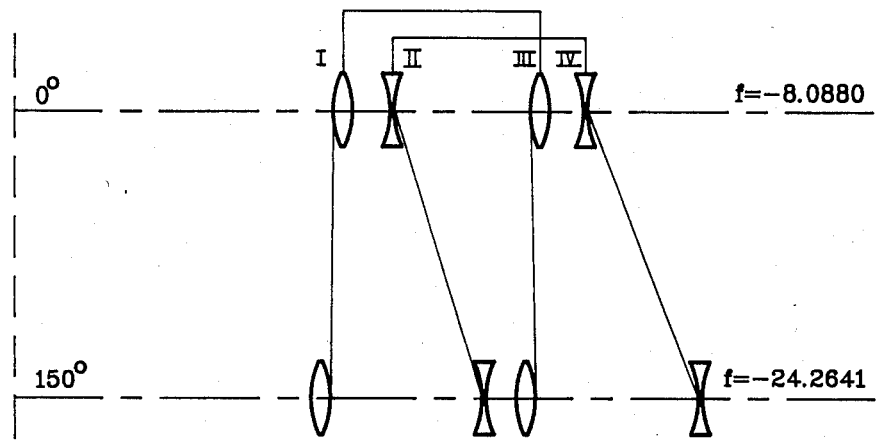
FIG. 4 illustrates particular lens movement for a four component system composed of positive, negative, positive, and negative lenses, in that order.

Next, the following explains the practical examples. FIG. 4 plots the movement of each lens component in accordance with a practical example using a positive lens, a negative lens, a positive lens, and a negative lens. Specifications are given below:

$f_I = 15.5654$    $d_{I,II} = 0.5 \sim 3.5$
$f_{II} = -5.0131$    $d_{II,III} = 3.4246 \sim 0.4246$
$f_{III} = 4.93770$    $d_{III,IV} = 0.9259 \sim 3.9259$
$f_{IV} = -4.5188$
$f = -8.0880 \sim -24.2641$ Zoom Ratio 3

$$1/\sqrt{\alpha} = 0.9$$

FIG. 5 plots the movement of each lens component in accordance with a practical example using a negative lens, a positive lens, a negative lens, and a positive lens. Specifications are given below:

$f_I = -10.6401$    $d_{I,II} = 0.45 \sim 3.45$
$F_{II} = 4.8561$    $d_{II,III} = 3.4611 \sim 0.4611$
$f_{III} = -2.9460$    $d_{III,IV} = 0.9254 \sim 3.9254$
$f_{IV} = 5.2295$
$f = 22.6083 \sim 5.6524$ Zoom Ratio 4

$$1/\sqrt{\alpha} = 1.1$$

As shown, two practical examples above, needless to say, that the mechanical compensating system zoom lens which completely compensates the out of focus can be obtained by giving non-straight line movements to any one of the lens components or the relay part positioned at the back of the zooming part.

While a preferred embodiment including several examples of a four component zoom lens system according to this invention has been shown and described, it is to be appreciated and understood that numerous changes can be made without departing from the scope of this invention.

I claim:

1. A zoom lens system comprising a body, first, second, third and fourth spaced apart lenses mounted on said body with their optical axes aligned, said second lens being between said first and third lenses, and said third lens being between said second and fourth lenses, first means for simultaneously moving said first and third lenses linearly, while in fixed spaced relation to each other, second means for simultaneously moving said second and fourth lenses linearly, while in fixed spaced relation to each other, and third means for moving said first and third lenses while simultaneously moving said second and fourth lenses differently from said first and third lenses, through a predetermined operable range of movement of said lenses to vary the power of the zoom lens system, and wherein, said first, second, third and fourth lenses are the only lenses of said zoom lens system.

2. A zoom lens system according to claim 1 wherein said third means comprises means for simultaneously moving all said lenses only in a common axial direction.

3. A zoom lens system according to claim 1 wherein said first and third lenses are positive lenses and said second and fourth lenses are negative lenses.

4. A zoom lens system according to claim 1 wherein said first and third lenses are negative lenses and said second and fourth lenses are positive lenses.

5. A zoom lens system according to claim 4 wherein said third means comprises means for simultaneously moving said negative and positive lenses only in a common axial direction.

6. A zoom lens system according to claim 1 further comprising means for simultaneously moving said body, as said lenses are moved, to maintain the image plane of the lens system at a substantially constant location.

* * * * *